(12) United States Patent
Zahdeh

(10) Patent No.: US 8,169,476 B2
(45) Date of Patent: May 1, 2012

(54) IN-CYLINDER IMAGING SYSTEM USING HIGH-SPEED IMAGING DEVICE AND HIGH INTENSITY LIGHT SOURCE FOR CAPTURING IMAGES IN COMBUSTION CHAMBER

(75) Inventor: Akram R. Zahdeh, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1267 days.

(21) Appl. No.: 11/853,431

(22) Filed: Sep. 11, 2007

(65) Prior Publication Data

US 2009/0015667 A1   Jan. 15, 2009

Related U.S. Application Data

(60) Provisional application No. 60/864,016, filed on Nov. 2, 2006.

(51) Int. Cl.
*H04N 7/18* (2006.01)
(52) U.S. Cl. ............................................. 348/82; 348/83
(58) Field of Classification Search ................... 348/82, 348/83; 431/13; 73/644, 865.8
See application file for complete search history.

(56) References Cited

U.S. PATENT DOCUMENTS

| | | | |
|---|---|---|---|
| 4,643,022 A | 2/1987 | Werlberger | |
| 5,922,948 A | 7/1999 | Lesko et al. | |
| H2034 H | 7/2002 | Hopkins | |
| 2006/0088793 A1* | 4/2006 | Brummel et al. | 431/13 |
| 2007/0089545 A1* | 4/2007 | Roney et al. | 73/865.8 |
| 2007/0157733 A1* | 7/2007 | Litzenberg et al. | 73/644 |

FOREIGN PATENT DOCUMENTS

| | | |
|---|---|---|
| DE | 19952240 A1 | 5/2001 |
| JP | 2002350334 A | 4/2002 |

* cited by examiner

*Primary Examiner* — Le Luu
(74) *Attorney, Agent, or Firm* — Quinn Law Group, PLLC

(57) ABSTRACT

An in-cylinder imaging apparatus is provided for an internal combustion engine defining a combustion chamber. The in-cylinder imaging apparatus includes a high-speed imaging device such as a high-speed digital camera. A borescope is provided in communication with the combustion chamber and is operable to communicate images of the combustion chamber to the high-speed imaging device. A high intensity light source, for example, a xenon light source, is operable to substantially illuminate the combustion chamber. The high-speed imaging device and borescope are in axial alignment with respect to each other and are mounted with respect to the internal combustion engine. A method of imaging the combustion chamber of the internal combustion engine during engine operation employing the disclosed in-cylinder imaging apparatus is also provided.

20 Claims, 3 Drawing Sheets

IN-CYLINDER IMAGING SYSTEM USING HIGH-SPEED IMAGING DEVICE AND HIGH INTENSITY LIGHT SOURCE FOR CAPTURING IMAGES IN COMBUSTION CHAMBER

CROSS REFERENCE TO RELATED APPLICATIONS

This application claims the benefit of U.S. Provisional Patent Application No. 60/864,016, filed Nov. 2, 2006, and which is hereby incorporated by reference in its entirety.

TECHNICAL FIELD

The present invention relates to an apparatus and method for imaging a combustion chamber of an internal combustion engine during engine operation.

BACKGROUND OF THE INVENTION

Engineers typically rely on combustion analysis when developing combustion chambers to increase the operating efficiency and performance of an internal combustion engine. Typically engineers have limited information about the combustion occurring within the combustion chamber of an operating or firing engine. This information may include items such as in-cylinder pressure indexed to engine rotation, thermal mapping, etc. However, because of the harsh environment (high pressure, high temperature, etc.) present within the combustion chamber while the engine is operating, it is difficult to obtain a visual image of the combustion process occurring within the combustion chamber.

SUMMARY OF THE INVENTION

An in-cylinder imaging apparatus is provided for an internal combustion engine defining a combustion chamber. The in-cylinder imaging apparatus includes a high-speed imaging device, such as a high-speed digital camera. A borescope is provided in communication with the combustion chamber and is operable to communicate images of the combustion chamber to the high-speed imaging device. A high intensity light source, such as a xenon light source, is operable to substantially illuminate the combustion chamber. The high-speed imaging device and borescope are mounted with respect to the internal combustion engine.

In a preferred embodiment, the high-speed imaging device is generally axially aligned with the borescope. Additionally, the high-speed imaging device is preferably mounted with respect to the internal combustion engine with a bracket having natural frequency modes greater than the inducing function of the internal combustion engine. A window formed, for example, from quartz may be disposed between the borescope and the combustion chamber to protect the borescope from the high pressures and temperatures present within the combustion chamber during operation of the internal combustion engine.

A prism formed, for example, from sapphire, may be disposed between the high intensity light source and the combustion chamber. The prism is preferably operable to disperse light from the high intensity light source into the combustion chamber. A fiber optic bundle may be provided to communicate light from the high intensity light source to the prism.

A method of imaging a combustion chamber of an internal combustion engine during engine operation is also provided. The method includes the steps of: A) mounting a borescope with respect to the internal combustion engine and in optical communication with the combustion chamber; B) mounting a high-speed imaging device with respect to the internal combustion engine and generally in axial alignment with the borescope such that the borescope is operable to communicate images from within the combustion chamber to the high-speed imaging device; C) illuminating the combustion chamber with light from a high intensity light source; and D) capturing the images of the combustion chamber with the high-speed imaging device while the internal combustion engine is operating.

The method may further include cooling the borescope with chilled and/or compressed gas. The step of illuminating the combustion chamber may include employing a dispersion prism to disperse the light into the combustion chamber. Furthermore, the step of mounting the high-speed imaging device with respect to the internal combustion engine may include the steps of: A) affixing a bracket to the internal combustion engine; B) machining the bracket to accept the high-speed imaging device while affixed to the internal combustion engine to ensure alignment between the high-speed imaging device and the borescope; and C) mounting the high-speed imaging device to the bracket. Additionally, the step of mounting the high-speed imaging device with respect to the internal combustion engine may further include the step of D) tuning the bracket such that the natural frequency modes of the bracket are greater than the inducing function of the internal combustion engine.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
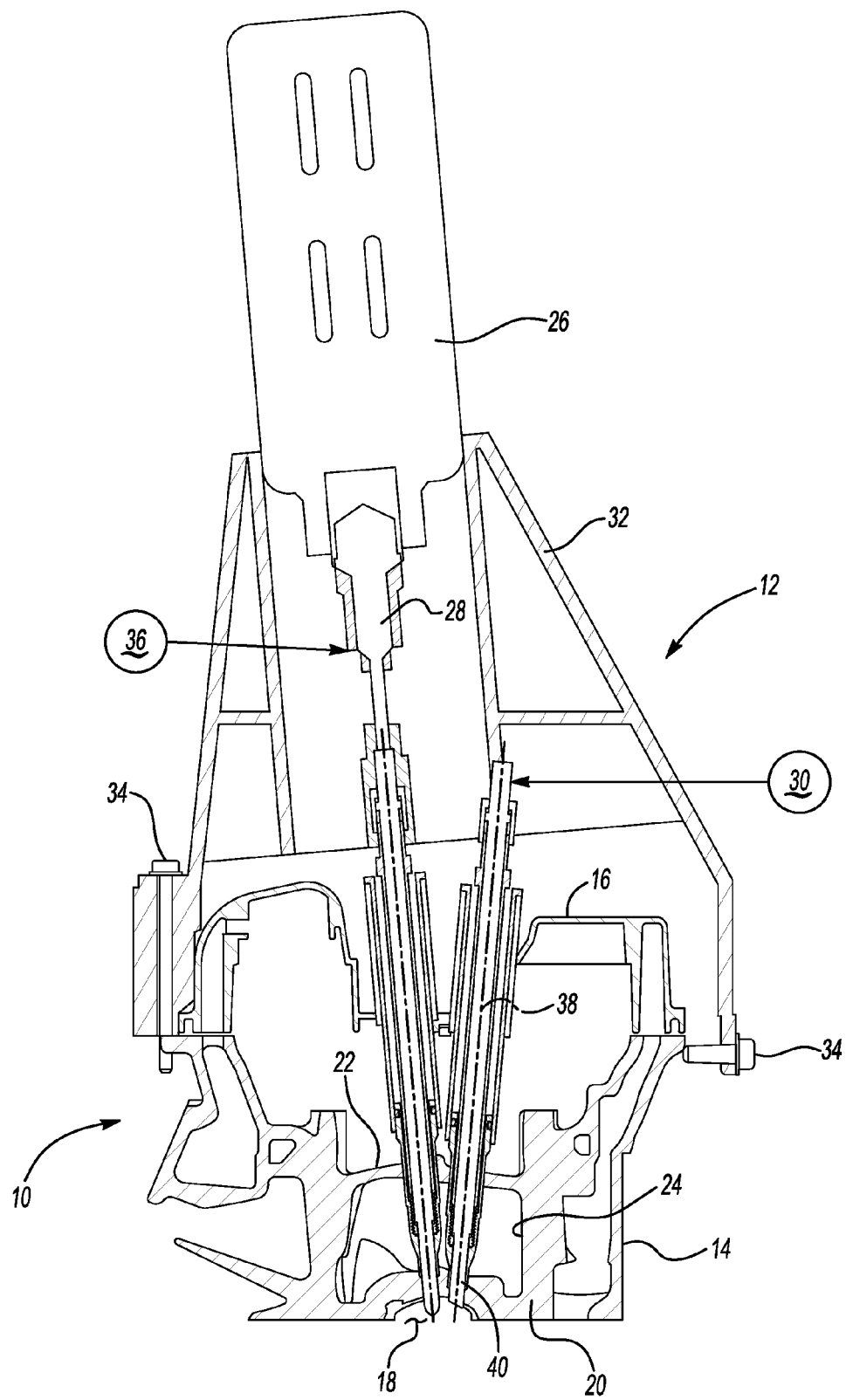
FIG. 1 is a cross sectional view of a portion of an internal combustion engine having an in-cylinder imaging apparatus mounted thereto.

Referring to the drawings wherein like reference numbers correspond to like or similar components throughout the several figures, there is shown in FIG. 1 a cross sectional view of a portion of an internal combustion engine 10. The internal combustion engine 10 has an in-cylinder imaging apparatus 12 mounted thereto. The internal combustion engine 10 includes a cylinder head 14 and a cam cover 16. The cylinder head 14 partially defines a combustion chamber 18 where a fuel is combusted with air during operation of the internal combustion engine 10. The cylinder head 14 is preferably formed from cast metal including, but not limited to, aluminum, iron, steel, magnesium, etc. The cylinder head 14 has a deck portion 20 configured to mate to a cylinder block, not shown, of the internal combustion engine 10. Additionally, the cylinder head 14 includes a spring deck portion 22 operable to provide a mounting surface for components of a valvetrain, not shown. The deck portion 20 and spring deck portion 22 cooperate to define a cooling jacket 24 through which coolant flows to effect cooling of the cylinder head 14.

The spring deck portion 22 is subject to lubrication oil splashed from the valvetrain during operation of the internal combustion engine 10. The cam cover 16 sealingly engages the cylinder head 14 to retain the lubrication oil within the internal combustion engine 10.

The in-cylinder imaging apparatus 12 includes a high-speed imaging device 26, borescope 28, and high intensity light source 30. The high-speed imaging device 26 is, for example, a digital camera with the capability of capturing images at a rate of, for example, up to 160,000 frames per second, in one embodiment, however other camera speeds may be used. The high-speed imaging device 26 is axially aligned with the borescope 28. The borescope 28 is in communication with the combustion chamber 18 and is operable to optically communicate images from within the combustion chamber 18 to the high-speed imaging device 26.

The high-speed imaging device 26 is mounted to the internal combustion engine 10 by a bracket 32. The bracket 32 also maintains the axial alignment between the high-speed imaging device 26 and the borescope 28. The bracket 32 is removably mounted to the cylinder head 14 by fasteners 34. The bracket 32 is formed, for example, from metal, such as thick gauge steel, having sufficient structural rigidity to effectively hold the high-speed imaging device 26 in relation to the borescope 28, to effect rigid motion between the internal combustion engine 10, borescope 28 and high-speed imaging device 26. In some embodiments, the bracket 32 is analyzed and tuned to ensure that the natural frequency modes of the bracket 32 are substantially above any modes of excitation or inducing function, such as the firing order of the internal combustion engine 10, to avoid resonances that may damage components within the borescope 28 and/or high-speed imaging device 26. An "inducing function" is an excitation pattern or input relationship which produces a vibration mode, such as the pattern or sequence of firing an engine. The bracket 32 is machined to accept the high-speed imaging device 26 when mounted on the internal combustion engine 10 in order to provide precise axial alignment with the borescope 28. A source of pressurized and chilled gas 36, such as air, is provided as a means to cool the borescope 28.

The high intensity light source 30 is operable to, for example, provide white light to the combustion chamber 18 to enhance the images provided by the borescope 28 to the high-speed imaging device 26. The high intensity light source 30 is preferably a xenon light source; however, those skilled in the art of optics and lighting will recognize other sources of high intensity light may be used while remaining within the scope of that which is claimed. Light from the high intensity light source 30 is communicated via a fiber optic bundle 38 to a dispersion prism 40. The dispersion prism 40 is operable to disperse the light from the high intensity light source 30 into the combustion chamber 18. The dispersion prism 40 of this embodiment is formed from a crystalline material, including, but not limited to, sapphire.

Figure 2:
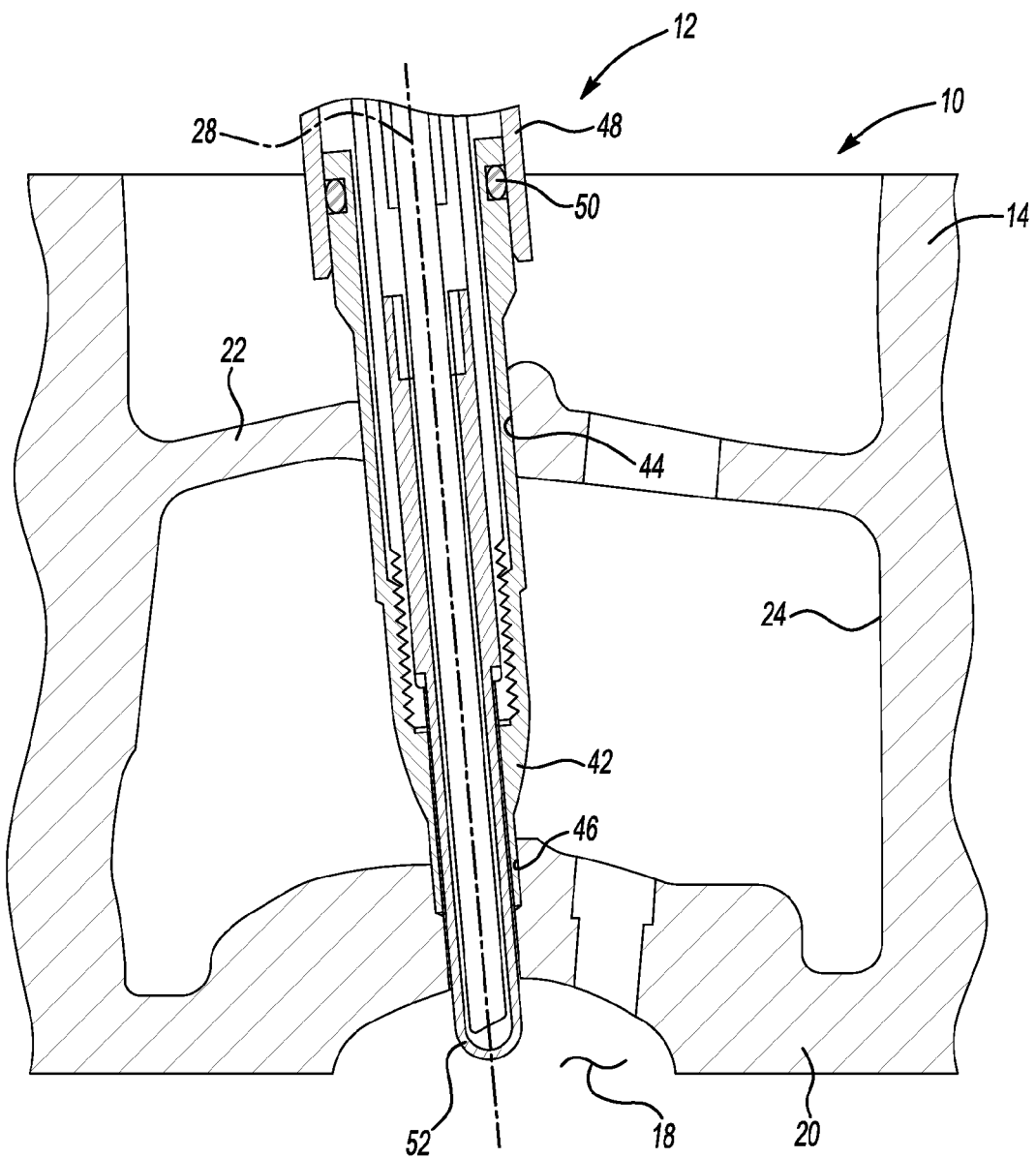
FIG. 2 is a cross sectional view illustrating aspects of a borescope of the in-cylinder imaging apparatus.

Referring now to FIG. 2, there is shown a cross sectional view illustrating components of the in-cylinder imaging apparatus 12. A generally tubular sleeve 42 extends through a bore 44, defined by the spring deck portion 22 of the cylinder head 14, and at least partially through a bore 46, defined by the deck portion 20 of the cylinder head 14. The bores 44 and 46 are formed by machining the cylinder head 14. The sleeve 42 may be fixed in relation to the cylinder head 14 through an interference fit or by an adhesive sealant, such as epoxy. The sleeve 42 is formed from a material having similar thermal expansion characteristics as the cylinder head 14 such that as the temperature of the cylinder head 14 increases, the sleeve 42 will remain fixed with respect to the cylinder head 14. The sleeve 42 is operable to seal the coolant jacket 24 from the combustion chamber 18, borescope 28, and spring deck portion 22. Additionally, the sleeve 42 is operable to prevent the lubricating oil from entering the cooling jacket 24 from the spring deck portion 22 or contacting the borescope 28.

An outer sleeve 48 extends through the cam cover 16, shown in FIG. 1, and coaxially engages the sleeve 42. An o-ring seal 50 is disposed about the outer periphery of the sleeve 42 and is operable to sealingly engage the outer sleeve 48. A window 52 is provided between the borescope 28 and the combustion chamber 18 and operates to protect the borescope 28 from the heat and pressure formed within the combustion chamber 18 during operation of the internal combustion engine 10. The window 52 is formed from a crystalline material such as quartz; however, those skilled in the art will recognize other materials that may be used including, but not limited to, sapphire and spinel, while remaining within the scope of that which is claimed.

Figure 3:
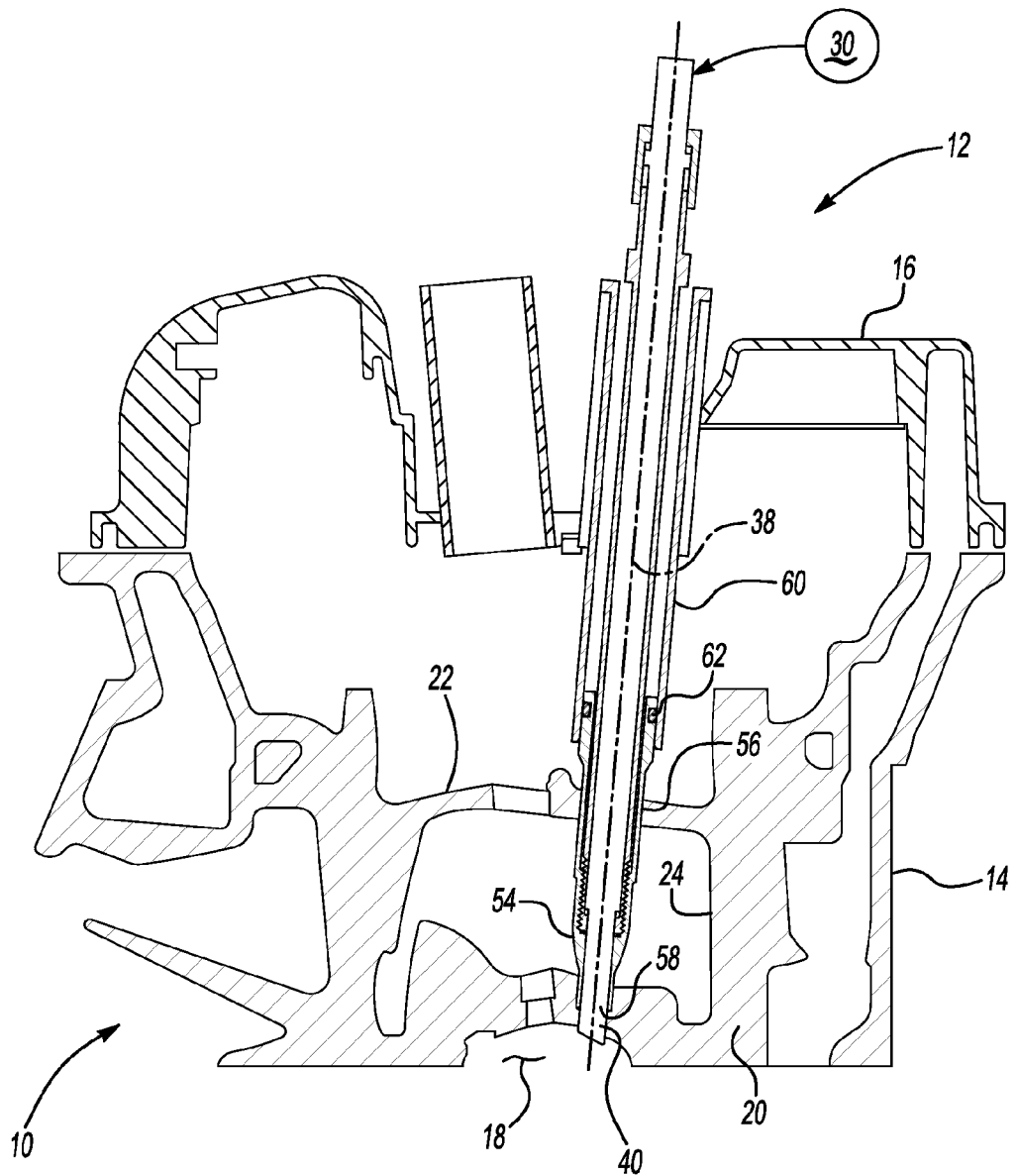
FIG. 3 is a magnified cross sectional view illustrating aspects of a high intensity light source of the in-cylinder imaging apparatus.

Referring now to FIG. 3 there is shown a cross sectional view further illustrating components of the in-cylinder imaging apparatus 12. A generally tubular sleeve 54 extends through a bore 56, defined by the spring deck portion 22 of the cylinder head 14, and at least partially through a bore 58, defined by the deck portion 20 of the cylinder head 14. The bores 56 and 58 are formed by machining the cylinder head 14. The sleeve 54 may be fixed in relation to the cylinder head 14 through an interference fit or by an adhesive sealant, such as epoxy. The sleeve 54 is formed, for example, from a material having similar thermal expansion characteristics as the cylinder head 14 such that as the temperature of the cylinder head 14 increases, the sleeve 54 will remain fixed with respect to the cylinder head 14. The sleeve 54 is operable to seal the coolant jacket 24 from the combustion chamber 18, fiber optic bundle 38, dispersion prism 40, and spring deck portion 22. Additionally, the sleeve 54 is operable to restrict the movement of lubricating oil from entering the cooling jacket 24 from the spring deck portion or contacting the fiber optic bundle 38 and dispersion prism 40. An outer sleeve 60 extends through the cam cover 16 and coaxially engages the sleeve 54. An o-ring seal 62 is disposed about the outer periphery of the sleeve 54 and is operable to sealingly engage the outer sleeve 60.

A method of imaging the combustion chamber 18 of the internal combustion engine 10 during engine operation is also provided. The method includes the steps of: A) mounting the borescope 28 with respect to the internal combustion engine 10 and in communication with the combustion chamber 18; B) mounting the high-speed imaging device 26 with respect to the internal combustion engine 10 and generally in axial alignment with the borescope 28 such that the borescope 28 is operable to communicate images from within the combustion chamber 18 to the high-speed imaging device 26; C) illuminating the combustion chamber 18 with light from the high intensity light source 30; and D) capturing the images of the combustion chamber 18 with the high-speed imaging device 26 while the internal combustion engine 10 is operating.

The method further includes cooling the borescope 28 with chilled and compressed gas from the chilled and compressed gas source 36. The step of illuminating the combustion chamber 18 includes employing a dispersion prism 40 to disperse the light into the combustion chamber 18. Furthermore, the step of mounting the high-speed imaging device 26 with respect to the internal combustion engine 10 preferably include the steps of: A) affixing the bracket 32 to the internal combustion engine 10; B) machining the bracket 32 to accept the high-speed imaging device 26 while affixed to the internal combustion engine 10 to ensure alignment between the high-speed imaging device 26 and the borescope 28; and C) mounting the high-speed imaging device 26 to the bracket 32. Additionally, the step of mounting the high-speed imaging device 26 with respect to the internal combustion engine 10 further includes the step of D) tuning the bracket 32 such that the natural frequency modes of the bracket 32 are greater than the inducing function of the internal combustion engine 10.

By incorporating the high-speed imaging device 26 within the in-cylinder imaging apparatus 12, the ability to obtain contiguous high-speed images of the combustion chamber 18 during engine operation will provide engine designers with additional information necessary to investigate combustion characteristics of the internal combustion engine 10. These combustion characteristics may include information such as, cylinder wall wetting by fuel, fuel spray characteristics, soot generation within the combustion chamber 18, flash boiling, etc. The in-cylinder imaging apparatus 12 may be used with both spark ignited and compression ignited internal combustion engines and may be a particularly useful tool in designing spark ignited direct injection and compression ignited engines, which require careful attention to be paid in the design of the combustion chamber, piston dome, and fuel spray characteristics and timing.

While the best modes for carrying out the invention have been described in detail, those familiar with the art to which this invention relates will recognize various alternative designs and embodiments for practicing the invention within the scope of the appended claims.

The invention claimed is:

1. An in-cylinder imaging apparatus for an internal combustion engine defining a combustion chamber, said in-cylinder imaging apparatus comprising:
    a high-speed imaging device;
    a borescope in optical communication with the combustion chamber and operable to communicate images of the combustion chamber to said high-speed imaging device;
    a high intensity light source operable to substantially illuminate the combustion chamber; and
    wherein said high-speed imaging device and said borescope are mounted with respect to the internal combustion engine.

2. The in-cylinder imaging apparatus of claim 1, wherein said high-speed imaging device and said borescope are axially aligned.

3. The in-cylinder imaging apparatus of claim 1, further comprising a protective window disposed between said borescope and the combustion chamber.

4. The in-cylinder imaging apparatus of claim 3, wherein said protective window is formed from at least one of quartz, spinel, and sapphire.

5. The in-cylinder imaging apparatus of claim 1, wherein said high-speed imaging device is a high-speed digital camera.

6. The in-cylinder imaging apparatus of claim 1, wherein said borescope is cooled with chilled and compressed gas.

7. The in-cylinder imaging apparatus of claim 1, further comprising a bracket operable to mount said high-speed imaging device to said engine.

8. The in-cylinder imaging apparatus of claim 7, wherein said bracket has natural frequency modes greater than an inducing function of the internal combustion engine.

9. The in-cylinder imaging apparatus of claim 1, wherein said high intensity light source is a xenon light source.

10. The in-cylinder imaging apparatus of claim 1, further comprising a prism disposed between said high intensity light source and the combustion chamber, wherein said prism is operable to disperse light from said high intensity light source into the combustion chamber.

11. The in-cylinder imaging apparatus of claim 10, wherein said prism is formed from sapphire.

12. The in-cylinder imaging apparatus of claim 10, further comprising a fiber optic bundle disposed between said high intensity light source and said prism, said fiber optic bundle being operable to communicate said light from said high intensity light source to said prism.

13. A method of imaging a combustion chamber of an internal combustion engine during engine operation, the method comprising:
    mounting a borescope with respect to the internal combustion engine and in optical communication with the combustion chamber;
    mounting a high-speed imaging device with respect to the internal combustion engine and in generally axial alignment with said borescope; such that said borescope is operable to communicate images from within the combustion chamber to said high-speed imaging device;
    illuminating the combustion chamber with light from a high intensity light source; and
    capturing said images of the combustion chamber with said high-speed imaging device while the internal combustion engine is operating.

14. The method of claim 13, further comprising cooling the borescope with chilled and compressed gas.

15. The method of claim 13, wherein illuminating the combustion chamber includes employing a dispersion prism to disperse said light into the combustion chamber.

16. The method of claim 15, further comprising communicating said light from said high intensity light source to said prism through a fiber optic bundle.

17. The method of claim 13, further comprising protecting said borescope by placing a window between said borescope and the combustion chamber.

18. The method of claim 17, wherein said window is selected from the group consisting of quartz, sapphire and spinel.

19. The method of claim 13, wherein mounting said high-speed imaging device with respect to the internal combustion engine includes:
    affixing a bracket to the internal combustion engine;
    machining said bracket to accept said high-speed imaging device while affixed to the internal combustion engine to ensure alignment between said high-speed imaging device and said borescope; and
    mounting said high-speed imaging device to said bracket.

20. The method of claim 13, wherein mounting said high-speed imaging device with respect to the internal combustion engine includes:
    affixing a bracket to the internal combustion engine;
    mounting said high-speed imaging device to said bracket; and
    tuning said bracket such that the natural frequency modes of said bracket are greater than an inducing function of the internal combustion engine.

* * * * *